(12) United States Patent
Mori

(10) Patent No.: US 7,556,787 B2
(45) Date of Patent: *Jul. 7, 2009

(54) METHOD AND APPARATUS FOR TREATING EXHAUST GASES CONTAINING FLUORINE-CONTAINING COMPOUNDS

(75) Inventor: Yoichi Mori, Kanagawa (JP)

(73) Assignee: Ebapa Corporation, Tokyo (JP)

( * ) Notice: Subject to any disclaimer, the term of this patent is extended or adjusted under 35 U.S.C. 154(b) by 870 days.

This patent is subject to a terminal disclaimer.

(21) Appl. No.: 10/483,773

(22) PCT Filed: Oct. 9, 2002

(86) PCT No.: PCT/JP02/10475

§ 371 (c)(1),
(2), (4) Date: May 13, 2004

(87) PCT Pub. No.: WO03/033116

PCT Pub. Date: Apr. 24, 2003

(65) Prior Publication Data
US 2004/0191147 A1 Sep. 30, 2004

(30) Foreign Application Priority Data
Oct. 10, 2001 (JP) ............................ 2001-312565

(51) Int. Cl.
| B01D 53/68 | (2006.01) |
| B01D 53/70 | (2006.01) |
| B01D 53/14 | (2006.01) |
| C01B 31/18 | (2006.01) |
| C10K 1/00 | (2006.01) |
| B01D 50/00 | (2006.01) |
| B01D 53/34 | (2006.01) |

(52) U.S. Cl. .................. 423/240 S; 423/246; 422/177
(58) Field of Classification Search ................. 422/172, 422/173, 177; 423/204, 240 S, 246
See application file for complete search history.

(56) References Cited

U.S. PATENT DOCUMENTS
2003/0103883 A1 6/2003 Mori

FOREIGN PATENT DOCUMENTS
| DE | 197 19 834 | 11/1998 |
| EP | 1 101 524 | 5/2001 |
| EP | 1 129 775 | 9/2001 |
| EP | 1 205 234 | 5/2002 |
| JP | 7-80303 | 3/1995 |
| JP | 2001-293335 | 10/2001 |
| WO | 00/74821 | 12/2000 |
| WO | 01/08786 | 2/2001 |

OTHER PUBLICATIONS

Patent Abstracts of Japan, vol. 1995, No. 06, Jul. 31, 1995 & JP 07 080303 A (Kyushu Univ), Mar. 28, 1995.
Patent Abstracts of Japan, vol. 2002, No. 02, Apr. 2, 2002 & JP 2001 293335 A (Ebara Corp.), Oct. 23, 2001.

*Primary Examiner*—Roy King
*Assistant Examiner*—Caitlin Fogarty
(74) *Attorney, Agent, or Firm*—Wenderoth, Lind & Ponack, LLP.

(57) ABSTRACT

A method for treating exhaust gases containing fluorine-containing compounds which comprises the steps of bringing an exhaust gas containing fluorine-containing compounds into contact with a metal catalyst carrying a tungsten oxide on an alumina-zirconium composite oxide and then bringing the emission into contact with a γ-alumina catalyst.

8 Claims, 1 Drawing Sheet

METHOD AND APPARATUS FOR TREATING EXHAUST GASES CONTAINING FLUORINE-CONTAINING COMPOUNDS

BACKGROUND OF THE INVENTION

This invention relates to treating of exhaust gases containing fluorine-containing compounds. More particularly, the invention relates to a method and apparatus for treating exhaust gases containing fluorine-containing compounds that are discharged in the semiconductor industry from the step of dry cleaning the inner surfaces and the like of semiconductor fabrication equipment and from the step of etching a variety of films including oxide films.

In the semiconductor industry, a great variety of harmful gases are used during the semiconductor fabrication process and those gases, if simply discharged into the environment, may potentially pollute it. Particularly in the step of cleaning the inner surfaces of semiconductor fabrication equipment and in the etching or CVD step, fluorine-containing compounds including hydrofluorocarbons such as $CHF_3$ and perfluorocarbons (PFCs) such as $CF_4$, $C_2F_6$, $C_3F_8$, $C_4F_6$, $C_4F_8$, $C_5F_8$, $SF_6$ and $NF_3$ are employed; the fluorine-containing compounds contained in exhaust gases from those steps are global warming gases and there is an urgent need for developing an effective system to remove them.

With a view to removing PFCs from PFC containing gases, the present inventors previously invented a method for thermally cracking PFC in the presence of both $O_2$ and $H_2O$ using a γ-alumina catalyst having a specified crystalline structure and applied for a patent on the method (Japanese Patent Application No. 2000-110668). A method has also been proposed for treating non-PFC flon gases by cracking flons with a cracking catalyst carrying a tungsten oxide on an alumina-zirconium composite oxide in the presence of a hydrocarbon such as n-butane and $O_2$ being used as cracking assist gases.

When the γ-alumina catalyst having the specified crystalline structure was used in PFC treatment according to the proposal made by the present inventors, the γ-alumina showed high enough cracking activity to achieve complete (100%) PFC removal, with no CO generated as a by-product. In spite of this high efficiency in treatment, the present inventors found by later studies that the γ-alumina gradually deteriorated as the passage of gas was prolonged and that the percentage of gas removal dropped within a shorter time than it was initially desired.

As for the metal catalyst carrying a tungsten oxide on an alumina-zirconium composite oxide, its use in the treatment of flon gases (e.g. flon-115) has been proposed but no review has been made about its applicability to refractory PFCs ($CF_4$, for example, must be cracked by heating to at least 1200° C.). In the proposed method, a hydrocarbon and $O_2$ are used as cracking assist gases but no review has been made about using $H_2O$ in place of the hydrocarbon. Hence, the metal catalyst carrying a tungsten oxide on an alumina-zirconium composite oxide has not been studied at all from the viewpoint of its activity in cracking PFCs in the presence of $H_2O$ and $O_2$.

SUMMARY OF THE INVENTION

Under these circumstances, the present inventors reviewed the activity of said metal catalyst in cracking PFCs and succeeded in providing a method for treating exhaust gases containing fluorine-containing compounds by which PFCs could be removed completely without concomitant generation of CO as a by-product and which could achieve high treatment efficiency over an extended period of time.

DETAILED DESCRIPTION OF THE INVENTION

Figure 1:
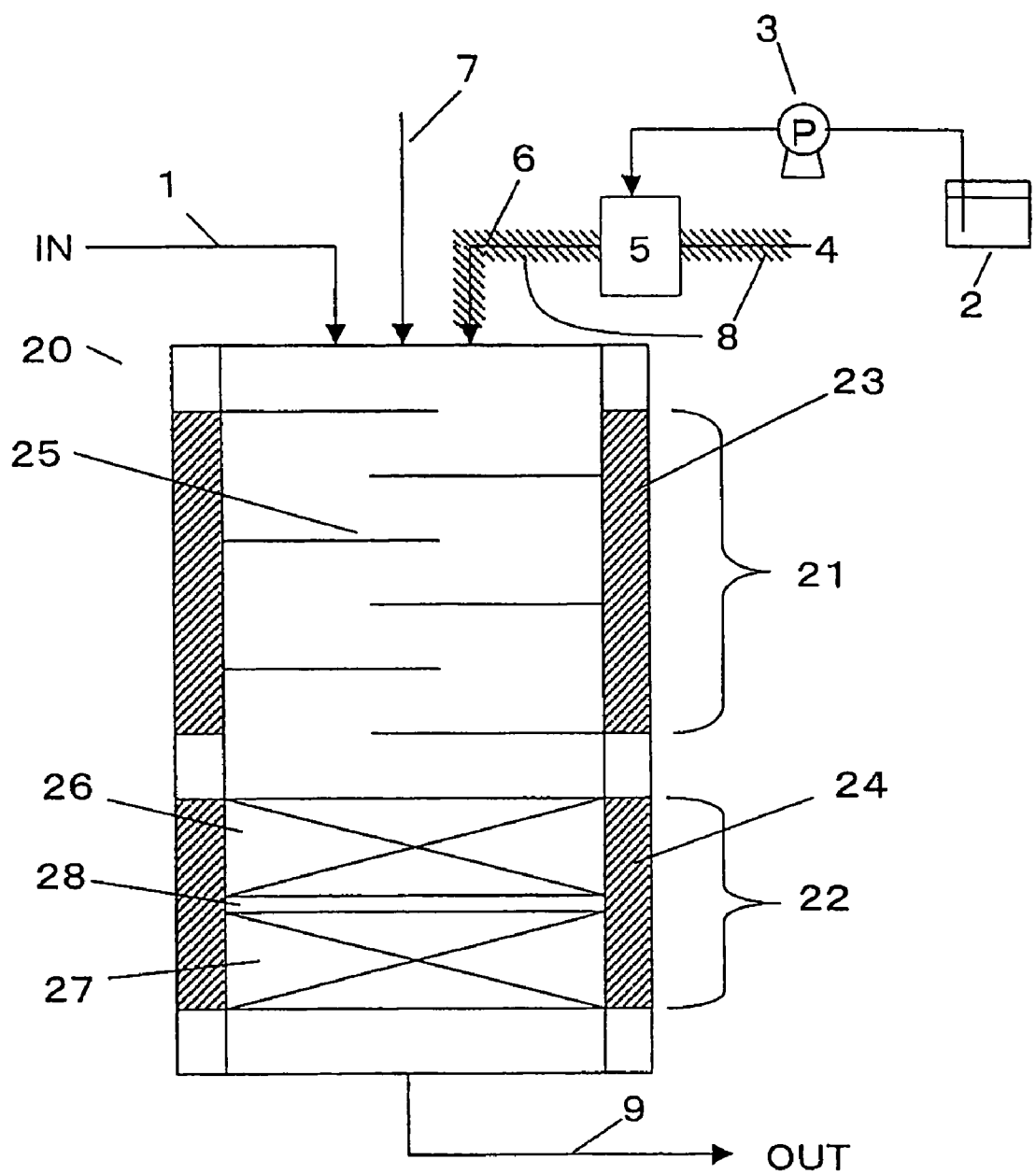
FIG. 1 shows in conceptual form an apparatus for treating exhaust gases containing $CF_4$ according to one aspect of the invention.

According to one aspect of the present invention, there is provided a method for treating exhaust gases containing fluorine-containing compounds which comprises the steps of bringing an exhaust gas containing fluorine-containing compounds into contact with a metal catalyst carrying a tungsten oxide on an alumina-zirconium composite oxide and then bringing the emission into contact with a γ-alumina catalyst.

In the method of the invention, an exhaust gas containing PFC and other fluorine-containing compounds (hereunder collectively referred to as PFCs) is passed through a bed of metal catalyst carrying a tungsten oxide on an alumina-zirconium composite oxide and then passed through a γ-alumina catalyst bed.

The metal catalyst that can be used in the invention and which carries a tungsten oxide on an alumina-zirconium compound oxide is of an $Al_2O_3$—$ZrO_2$—$WO_3$ system and the catalyst disclosed in Japanese Patent No. 2569421 can be used with advantage. In a preferred case, the zirconium content of the alumina-zirconium composite oxide is 0.2-0.8. To mention just one example, an $Al_2O_3$—$ZrO_2$—$WO_3$ catalyst in which the molar ratios of $Al_2O_3$, $ZrO_2$ and WO3 are 0.75, 0.2 and 0.05, respectively, can be used with advantage. In order to secure the largest possible area of contact, the size of the catalyst is preferably as small as possible on the condition that there be no increase in the resistance to the passage of gas. For example, it is preferred to use a generally cylindrical shape of extrusion molding that measures about 0.8-5 mm in diameter and about 5-15 mm in length.

Any γ-alumina that is known to be capable of cracking PFCs can be used as the alumina catalyst in the present invention. Preferred for use is the γ-alumina which the present inventors proposed in Japanese Patent Application No. 2000-110668 and which has such a crystalline structure that a diffraction line with an intensity of 100 or more appears at the following five diffraction angles 2θ measured with an X-ray diffractometer, 33°±1°, 37°±1°, 40°±1 , 46°±1° and 67°±1°. In order to secure the largest possible area of contact, the size of the γ-alumina is preferably as small as possible on the condition that there be no increase in the resistance to the passage of gas. For example, it is preferred to use a particulate shape that measures about 0.8-2.6 mm, more particularly 1.0-2.0 mm, in diameter.

In the method of the invention, the exhaust gas being brought into contact with the metal catalyst bed and the alumina catalyst bed is preferably at a temperature of 600-900° C. It is also preferred to add $O_2$ and $H_2O$ as cracking assist gases to the exhaust gas before it is brought into contact with the metal catalyst bed and the alumina catalyst. In this case, $H_2O$ is preferably introduced in a gaseous state; to this end, $H_2O$ may be pumped out of a $H_2O$ tank into an evaporator, where it is heated to 100° C. and above so that it is all converted to water vapor, which is then forced out by means of an inert gas such as $N_2$ and introduced into the reaction system.

If the exhaust gas containing PFCs and other fluorine-containing compounds is passed through the bed of cracking catalyst of the $Al_2O_3$—$ZrO_2$—$WO_3$ system (metal catalyst bed), preferably in the presence of both $O_2$ and $H_2O$, and then passed through the γ-alumina bed (alumina catalyst bed), $CF_4$ which is a PFC gas, an oxidizing gas such as $F_2$ and other gases such as CO are decomposed into $CO_2$ and HF by the following reactions:

$$CF_4 + 2H_2O \rightarrow CO_2 + 4HF$$

$$CF_4 + 2H_2O + O_2 \rightarrow CO_2 + 4HF + O_2$$

$$2F_2 + 2H_2O \rightarrow 4HF + O_2$$

$$2CO + O_2 \rightarrow 2CO_2$$

Thus, $CF_4$ reacts with $H_2O$ and $O_2$ to be decomposed into $CO_2$ and HF whereas the oxidizing gas such as $F_2$ reacts with $H_2O$ to be decomposed to HF, and CO is oxidized to $CO_2$.

In the contemplated reactions, $O_2$ is preferably added in moles which are one more than the minimum number of moles specified above and $H_2O$ is preferably added in 6-10 moles per mole of PFC.

The efficiency of the reaction $2CO + O_2 \rightarrow 2CO_2$ increases with the increasing molar concentration of $O_2$ because the difference between the molar concentrations of CO and $O_2$ is so great that $O_2$ surrounds the CO molecule more easily and their reactivtiy is increased. Further, due to the collision of individual $O_2$ molecules in stream, $O_2$ becomes a radical of higher activity. Therefore, it is preferred to add $O_2$ in moles at least 5 times the number of moles of CO.

The present invention also provides an apparatus for implementing the above-described method. Thus, according to its second embodiment, the invention provides an apparatus for treating exhaust gases containing fluorine-containing compounds which comprises a reaction vessel comprising a metal catalyst bed packed with a cracking catalyst carrying a tungsten oxide on an alumina-zirconium composite oxide and an alumina catalyst bed that is placed downstream of the metal catalyst bed and which is packed with γ-alumina, as well as means for introducing an exhaust gas containing fluorine-containing compounds and means for discharging the gas from the reaction vessel.

In the apparatus of the invention, the reaction vessel consists basically of two catalyst beds, one for the first-stage treatment which is a bed of cracking catalyst (of $Al_2O_3$—$ZrO_2$—$WO_3$ system) carrying a tungsten oxide on an alumina-zirconium composite oxide (metal catalyst bed) and the other for the second-stage treatment which is a γ-alumina bed (alumina catalyst bed). With this dual-bed arrangement, the catalyst of $Al_2O_3$—$ZrO_2$—$WO_3$ system at the first stage achieves partial removal of $CF_4$ and CO and the γ-alumina at the second stage takes care of the untreated $CF_4$ and CO. With this design, the service lives of the respective catalysts can be controlled easily and they can be replaced independently of each other, thus leading to effective use of the catalysts.

In the reaction vessel of the invention apparatus, the bed of $Al_2O_3$—$ZrO_2$—$WO_3$ catalyst at the first stage and the γ-alumina bed at the second stage are preferably packed into a cylindrical or otherwise shaped container, with a metal screen typically made of stainless steel being placed between the two beds. The dimensions of the reaction vessel to be used in the invention can be determined as appropriate for the limits imposed by the flow of the gas to be treated and the installation space of the apparatus. Generally, the catalyst of $Al_2O_3$—$ZrO_2$—$WO_3$ system in the form of a cylindrical extrusion molded shape which, as already mentioned above, measures about 0.8-5 mm in diameter and about 5-15 mm in length may be packed into a cylinder with an inside diameter of 10-20 cm to a height of 25-80 cm; then, γ-alumina particles which, as also mentioned above, measure 0.8-4.5 in diameter are packed downstream of the metal catalyst, with the two catalyst beds being spaced apart by a stainless steel screen which is preferably 0.08-0.16 cm thick. Thus, at each of the first and second stages of treatment in the reaction vessel, layers of the same cracking catalyst are stacked so closely that the zone in which the exhaust gas reacts with $H_2O$ and $O_2$ can be shortened in the direction of flow; this contributes to reducing not only the unevenness in the reactions that occur in each of the cracking catalyst beds but also the overall size of the apparatus. In the apparatus of the invention, the metal catalyst bed and the γ-alumina bed may be placed within the same column as just described above to construct a reaction vessel of monolithic type; alternatively, the two catalyst beds may be placed in separate columns which are cascaded to construct a reaction vessel of split type.

The apparatus of the invention is preferably equipped with a preheating vessel which performs preliminary heating of the exhaust gas, preferably together with $H_2O$ and $O_2$, to a temperature of 600-900° C. By allowing the exhaust gas as well as $H_2O$ and $O_2$ to pass through the reaction vessel (catalyst beds) after they are heated in the preliminary heating vessel, the uniformity of the cracking catalysts in the reaction vessel can be retained. If the exhaust gas and the cracking assist gases are introduced into the reaction vessel without preliminary heating, the topmost part of the metal catalyst bed is deprived of thermal energy and cooled upon contact with the exhaust gas. In a preferred embodiment of the invention, the exhaust gas, preferably together with $H_2O$ and $O_2$, are heated to 600-900° C. in the preheating vessel before they are introduced into the catalyst beds, so the cracking catalysts will not be deprived of any heat; in addition, the required heating of the reaction vessel can be held to a minimum level that is sufficient to compensate for the heat of radiation from said vessel and this contributes a lot to cost reduction.

FIG. 1 shows in conceptual form an apparatus for treating exhaust gases containing fluorine-containing compounds in accordance with a preferred embodiment of the invention. The apparatus of the invention for treating fluorine-containing compounds (which are hereunder referred to as PFC exhaust gas) has a reaction unit 20. The reaction unit 20 is divided into a preheating vessel 21 at the first stage and a catalytic reaction vessel 22 at the second stage. The preheating vessel 21 and the catalytic reaction vessel 22 are equipped with heating jackets 23 and 24, respectively, for heating the gas atmospheres in the respective vessels to predetermined temperatures and holding those temperatures. In the apparatus of the design shown in FIG. 1, the preheating vessel 21 is positioned above the catalytic reaction vessel 22 so as to provide such a fluid communication that the exhaust gas to be treated runs down the preheating vessel 21 to flow into the catalytic reaction vessel 22. In the embodiment under consideration, cylindrical containers of identical size are used as the preheating vessel 21 and the catalytic reaction vessel 22.

Provided at the top of the preheating vessel 21 are an exhaust gas supply line 1 through which the exhaust gas containing PFCs and other fluorine-containing compounds is introduced into the reaction unit 20, an $O_2$ supply line 7 through which an assist $O_2$ gas is introduced into the reaction unit 20 and a $H_2O$ supply line 6 through which an assist $H_2O$ gas is introduced into the reaction unit 20. The exhaust gas supply line 1 is connected via piping to a PFC exhaust gas supply source (not shown) such as an exhaust gas line in a semiconductor fabrication apparatus. The $O_2$ supply line 7 is connected to an $O_2$ supply source (not shown) via piping. The $H_2O$ supply line 6 is connected to an evaporator 5 via piping around which a band heater 8 is wound. The evaporator 5 is connected to a $H_2O$ (liquid) tank 2 via piping fitted with a storage pump 3; the evaporator 5 is also connected to an inert gas ($N_2$) supply source 4 via piping.

The preheating vessel 21 has a hollow internal space into which the PFC exhaust gas, $O_2$ and $H_2O$ are introduced through the respective supply lines 1, 6 and 7 and the introduced gases are preliminarily heated at 600-900° C. in the preheating vessel. The preheating vessel 21 may optionally be provided with a plurality of deflectors 25 for promoting the heating of the PFC emission gas. The deflectors 25 are plates or fins that are slightly longer than the inner radius of the preheating vessel 21 and they may be provided on the inner surface of the preheating vessel 21 either spirally or in such a way that they alternate radially to face each other. In order to measure the temperature in the preheating vessel 21, thermocouples (not shown) may be provided within the preheating vessel 21. Deflectors of other shapes may be employed as the means for promoting the heating of the exhaust gas; alternatively, in place of or in combination with the deflectors, layers of filler material causing small pressure loss may be installed within the preheating vessel.

Downstream of the preheating vessel 21 (in the lower part of the apparatus of the design shown in FIG. 1), the catalytic reaction vessel 22 is provided to provide fluid communication with the preheating vessel 21. The catalytic reaction vessel 22 is further divided into two beds and a bed 26 at the first stage is filled with a catalyst of $Al_2O_3$—$ZrO_2$—$WO_3$ system and a bed 27 at the second stage is filled with γ-alumina. The two catalyst beds 26 and 27 are separated by a stainless steel screen 28.

A jacket 24 for heating γ-alumina at 600-900° C. is preferably provided on the outer circumference of the catalytic reaction vessel 22. In order to measure the temperature in the catalytic reaction vessel 22, thermocouples (not shown) may be provided in its interior.

The PFC exhaust gas to be treated by the method of the invention and $O_2$ as a cracking assist gas are introduced into the preheating vessel via the lines 1 and 7. As for the other cracking assist gas $H_2O$, water (liquid) is supplied from the water tank 2 into the evaporator 5 by means of the pump 3 and the water vapor generated in the evaporator 5 is introduced into the preheating vessel 21 through the line 6 as carried by $N_2$ supplied through the line 4. The exhaust gas and the cracking assist gases as introduced into the preheating vessel 21 are heated to 600-900° C. The heated gas mixture is then introduced into the catalytic reaction vessel 22 where it is held at a temperature of 600-900° C. as the PFCs and other fluorine-containing compounds are subjected to progressive cracking reactions by means of the catalyst of $Al_2O_3$—$ZrO_2$—$WO_3$ system at the first stage and the γ-alumina at the second stage. The treated gas containing cracked PFCs and other fluorine-containing compounds is discharged out of the system via an emission line 9.

The following examples are provided for further illustrating the present invention but are in no way to be taken as limiting.

EXAMPLE 1

An experiment was run to treat a PFC exhaust gas according to the method of the invention. A stainless steel mini-column having an inside diameter of 27 mm and a length of 500 mm was packed with a catalyst of $Al_2O_3$—$ZrO_2$—$WO_3$ system and γ-alumina. As the catalyst of $Al_2O_3$—$ZrO_2$—$WO_3$ system, one having a compositional ratio (molar ratio) of $0.75\,Al_2O_3$, $_{0.2}\,ZrO_2$ and $0.05\,WO_3$ and which was manufactured by Süd-Chemie Catalysis AG as a trial (in the form of particles 2 mm in diameter and 5 mm long) was used and packed to a bed height of 50 mm (at a loading of 29 mL). As γ-alumina, NEOBEAD GB-08 (the trade name of Mizusawa Industrial Chemicals, Ltd.; in the form of particles with $Na_2O$ content≦0.01 wt % and a size of 0.8 mm) which had such a crystalline structure that a diffraction line with an intensity of 100 or more would appear at the following five diffraction angles 2θ measured with an X-ray diffractometer, 33°±1°, 37°±1°, 40°±1°, 46°±1° and 67°±1° was packed to a bed height of 50 mm (at a loading of 29 mL). The two catalyst beds were spaced apart by a 20-mesh stainless steel screen having a thickness of 0.8 mm. Thermocouples were installed in the column to measure its internal temperature and it was fitted within a ceramic tubular electric furnace, with the catalyst bed of $Al_2O_3$—$ZrO_2$—$WO_3$ system being in the upper part.

The catalyst bed of $Al_2O_3$—$ZrO_2$—$WO_3$ system and the γ-alumina catalyst bed were heated at 750° C. as $N_2$-diluted $CF_4$ and more than equivalent amounts of assist gases $O_2$ and $H_2O$ were introduced into the column from the top. The total gas flow was 410 sccm with $CF_4$ and $O_2$ being flowed at respective concentrations of 1.0% and 5.0% and $H_2O$ supplied at 0.059 mL/min.

The concentrations of $CF_4$ and CO in the exit gas from the column were measured with a gas chromatograph fitted with a mass analyzer (AGS-7000U, product of ANELVA Corporation); the results are shown in Table 1. Throughout the period of 280 hours from the start of the experiment, $CF_4$ and CO were undetectable. According to the invention, complete removal of $CF_4$ was possible without generating CO as a by-product.

COMPARATIVE EXAMPLE 1

An experiment was run to treat a PFC exhaust gas using only γ-alumina. The procedure was the same as in Example 1 except that the stainless steel mini-column was packed with γ-alumina to a bed height of 100 mm (at a loading of 58 mL). The results are shown in Table 1; the CO level was invariably lower than the detection limit but the percent removal of $CF_4$ gradually decreased with time (it remained 100% for 60 hours but dropped to 98% after the lapse of 90 hours).

COMPARATIVE EXAMPLE 2

An experiment was run to treat a PFC exhaust gas using only a catalyst of $Al_2O_3$—$ZrO_2$—$WO_3$ system. The procedure was the same as in Example 1 except that the stainless steel mini-column was packed with the catalyst of interest to a bed height of 100 mm (at a loading of 58 mL). The results are shown in Table 1; $CF_4$ started to leak out in small quantities in a comparatively short time, making its complete removal impossible; however, the percent removal of $CF_4$ was more than 98% even after the lapse of 90 hours. Nevertheless, CO was discharged in amounts exceeding the tolerable 25 ppm {TLV-TWA value (Threshold Limit Value-Time Weighted Average Concentration) set by the American Conference of Governmental Industrial Hygienists)}.

TABLE 1

Example 1 vs. Comparative Examples 1 and 2

| Time of gas passage hr | Ex. 1 | | Comp. Ex. 1 | | Comp. Ex. 2 | |
|---|---|---|---|---|---|---|
| | $CF_4$ ppm | CO ppm | $CF_4$ ppm | CO ppm | $CF_4$ ppm | CO ppm |
| 10 | <1 | <2 | <1 | <2 | 4.4 | 20 |
| 20 | <1 | <2 | <1 | <2 | 11 | 20 |
| 30 | <1 | <2 | <1 | <2 | 17 | 25 |
| 40 | <1 | <2 | <1 | <2 | 26 | 25 |
| 50 | <1 | <2 | <1 | <2 | 31 | 25 |
| 60 | <1 | <2 | <1 | <2 | 40 | 25 |
| 63 | <1 | <2 | 1.3 | <2 | 37 | 25 |
| 66 | <1 | <2 | 2.7 | <2 | 56 | 25 |

TABLE 1-continued

Example 1 vs. Comparative Examples 1 and 2

| | Ex. 1 | | Comp. Ex. 1 | | Comp. Ex. 2 | |
|---|---|---|---|---|---|---|
| Time of gas passage hr | $CF_4$ ppm | CO ppm | $CF_4$ ppm | CO ppm | $CF_4$ ppm | CO ppm |
| 69 | <1 | <2 | 10 | <2 | 37 | 25 |
| 72 | <1 | <2 | 25 | <2 | 45 | 25 |
| 75 | <1 | <2 | 36 | <2 | 49 | 25 |
| 78 | <1 | <2 | 54 | <2 | 57 | 25 |
| 81 | <1 | <2 | 70 | <2 | 54 | 25 |
| 84 | <1 | <2 | 100 | <2 | 50 | 35 |
| 87 | <1 | <2 | 160 | <2 | 43 | 35 |
| 90 | <1 | <2 | 200 | <2 | 48 | 35 |
| 100 | <1 | <2 | — | — | 49 | 35 |
| 120 | <1 | <2 | — | — | 54 | 35 |
| 140 | <1 | <2 | — | — | 70 | 35 |
| 160 | <1 | <2 | — | — | 81 | 35 |
| 180 | <1 | <2 | — | — | 83 | 35 |
| 200 | <1 | <2 | — | — | 94 | 35 |
| 220 | <1 | <2 | — | — | 98 | 35 |
| 240 | <1 | <2 | — | — | 90 | 35 |
| 260 | <1 | <2 | — | — | 95 | 35 |
| 280 | <1 | <2 | — | — | 91 | 35 |

According to the invention, exhaust gases containing PFCs and other fluorine-containing compounds can be totally freed of PFCs and other fluorine-containing compounds without causing undue generation of CO as a by-product; the effectiveness of the invention lasts for a very long time.

The invention claimed is:

1. A method for treating an exhaust gas containing fluorine-containing compounds, which comprises the steps of:
    subjecting the exhaust gas to preliminary treatment whereby the exhaust gas is brought into contact with a metal catalyst carrying a tungsten oxide on an alumina-zirconium composite oxide, thereby partially removing perfluorocarbons (PFCs) and carbon monoxide from the exhaust gas, and
    then bringing an emission obtained from the preliminary treatment into contact with a γ-alumina catalyst to further remove perfluorocarbons (PFCs) and carbon monoxide from the emission,
    wherein the γ-alumina has such a crystalline structure that a diffraction line with an intensity of 100 or more appears at the following five diffraction angles 2θ X-ray diffractometer, 33°±1°, 37°±1°, 40°±1°, 46°±1° and 67°±1°.

2. The method according to claim 1, wherein a temperature for the preliminary treatment and for bringing the emission obtained from the preliminary treatment into contact with the γ-alumina catalyst ranges from 600° to 900° C.

3. The method according to claim 1, further comprising adding $O_2$ and $H_2O$ as cracking assist gases to the exhaust gas before it is brought into contact with the metal catalyst and the alumina gas.

4. The method according to claim 2, further comprising adding $O_2$ and $H_2O$ as cracking assist gases to the exhaust gas before it is brought into contact with the metal catalyst and the alumina gas.

5. An apparatus for treating an exhaust gas containing fluorine-containing compounds which comprises:
    a reaction vessel comprising a metal catalyst bed packed with a cracking catalyst carrying a tungsten oxide on an alumina-zirconium composite oxide,
    an alumina catalyst bed that is placed downstream of the metal catalyst bed and which is packed with γ-alumina, and
    means for introducing an exhaust gas containing fluorine-containing compounds and means for discharging the gas from the reaction vessel,
    wherein the γ-alumina has such a crystalline structure that a diffraction line with an intensity of 100 or more appears at the following five diffraction angles 2θ measured with an X-ray diffractometer, 33°±1°, 37°±1°, 40°±1°, 46°±1° and 67°±1°.

6. The apparatus according to claim 5, further comprising means for adding $O_2$ and $H_2O$ to the exhaust gas as cracking assist gases.

7. The apparatus according to claim 5, further comprising means for heating the exhaust gas.

8. The apparatus according to claim 6, further comprising means for heating the exhaust gas.

* * * * *

UNITED STATES PATENT AND TRADEMARK OFFICE
CERTIFICATE OF CORRECTION

PATENT NO. : 7,556,787 B2
APPLICATION NO. : 10/483773
DATED : July 7, 2009
INVENTOR(S) : Yoichi Mori It is certified that error appears in the above-identified patent and that said Letters Patent is hereby corrected as shown below:

Title Page, Item (73) Assignee: "Ebapa Corporation" should be --Ebara Corporation--.

Signed and Sealed this

Twenty-second Day of September, 2009

David J. Kappos
*Director of the United States Patent and Trademark Office*